(12) United States Patent
Hofbauer et al.

(10) Patent No.: US 9,574,664 B2
(45) Date of Patent: Feb. 21, 2017

(54) DUAL RING CONFIGURATION FOR A STATIONARY SEAL

(71) Applicant: EcoMotors, Inc., Allen Park, MI (US)

(72) Inventors: Peter Hofbauer, West Bloomfield, MI (US); Diana Brehob, Dearborn, MI (US)

(73) Assignee: EcoMotors, Inc., Allen Park, MI (US)

( * ) Notice: Subject to any disclaimer, the term of this patent is extended or adjusted under 35 U.S.C. 154(b) by 377 days.

(21) Appl. No.: 14/268,012

(22) Filed: May 2, 2014

(65) Prior Publication Data

US 2014/0326131 A1    Nov. 6, 2014

Related U.S. Application Data

(60) Provisional application No. 61/818,933, filed on May 3, 2013.

(51) Int. Cl.
*F16J 9/14* (2006.01)
*F16J 10/02* (2006.01)

(52) U.S. Cl.
CPC ...... *F16J 10/02* (2013.01); *F16J 9/14* (2013.01); *Y10T 29/49256* (2015.01)

(58) Field of Classification Search
CPC ....... F16J 9/14; F16J 15/3272; F02F 2001/006
See application file for complete search history.

(56) References Cited

U.S. PATENT DOCUMENTS

| | | | |
|---|---|---|---|
| 1,762,598 A | 6/1930 | Teetor | |
| 2,462,586 A * | 2/1949 | Whittingham | F16J 9/14 277/452 |
| 2,695,825 A | 11/1954 | Estey | |
| 2,833,604 A | 5/1958 | Hunt | |
| 3,097,855 A * | 7/1963 | Allen | F16J 9/14 277/496 |
| 3,134,602 A | 5/1964 | Wilson | |

FOREIGN PATENT DOCUMENTS

WO    WO 2011/0720063 A1    6/2011

* cited by examiner

*Primary Examiner* — F. Daniel Lopez
(74) *Attorney, Agent, or Firm* — Barnes & Thornburg LLP

(57) ABSTRACT

In a piston-ported engine, a sealing ring may be placed in a groove in the cylinder. As the groove is of greater diameter than the cylinder, the sealing ring overlaps into a helix allowing it to be enter the cylinder. However, such a helix does not fit into a groove without when in the helix. Alternatively, a shorter sealing ring is placed into the groove. However, the gap is too large. According to one embodiment, a groove of double the width of the ring is provided and the helical ring is installed and caused to unwind in the groove so that the ring sits in a plane. A spacer ring is placed in the groove to fill the extra space in the groove. An elastomeric material or a tension spring in an outer groove in the sealing ring can be used to cause the ring to press against the piston.

18 Claims, 6 Drawing Sheets

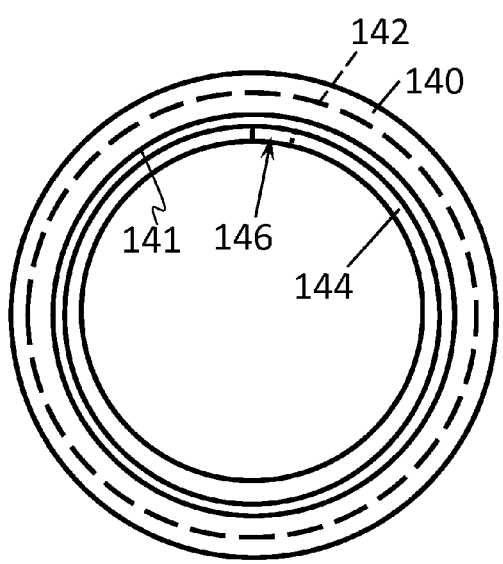
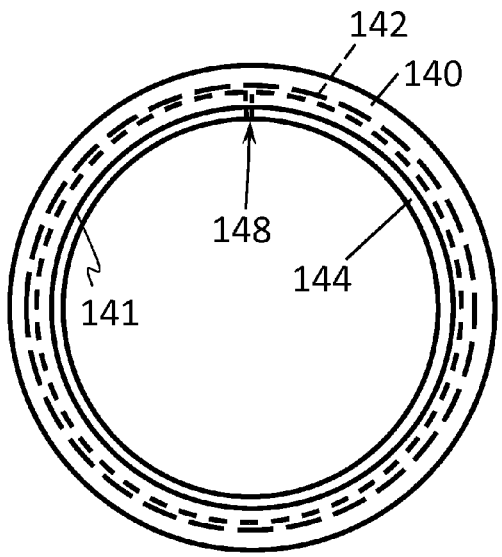
Figure 5    Figure 8
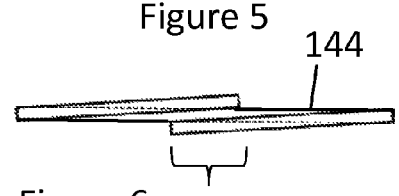
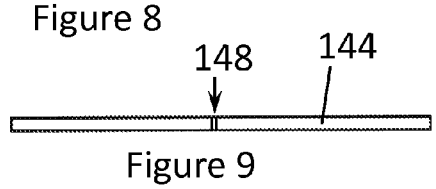
Figure 6    Figure 9
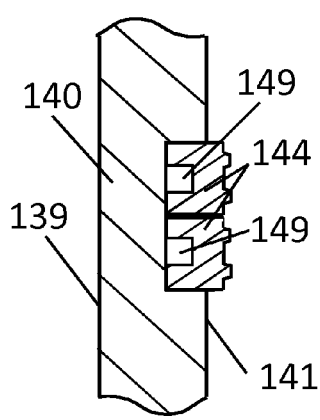
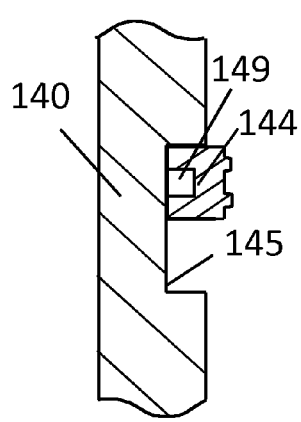
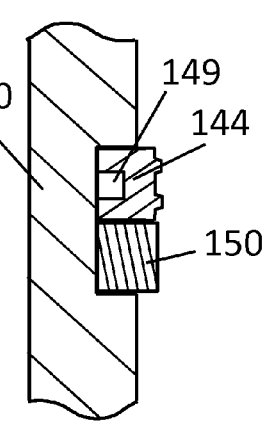
Figure 7    Figure 10    Figure 11

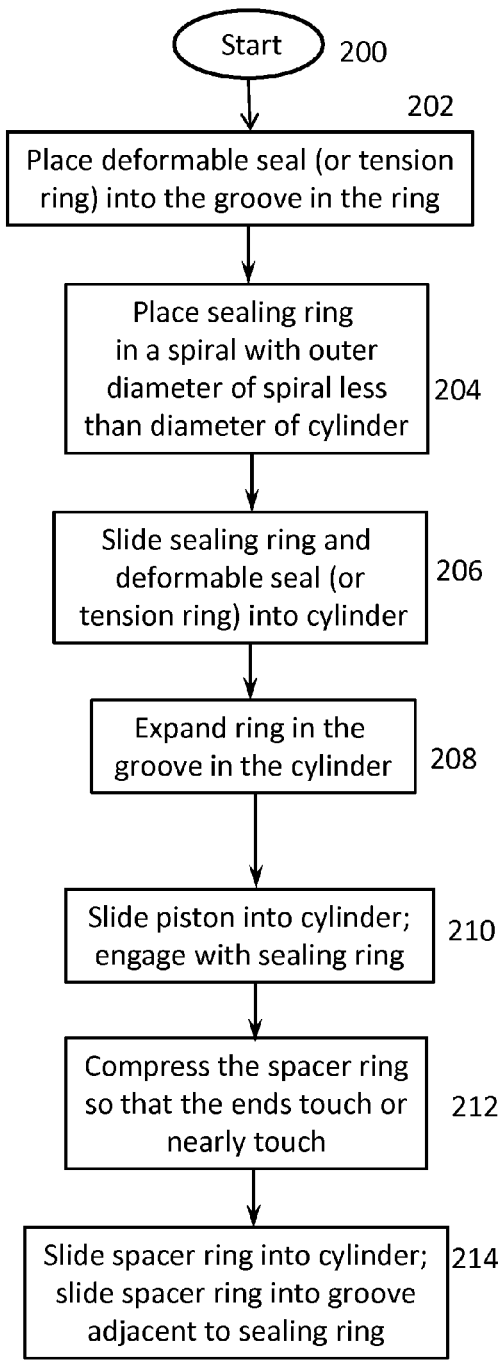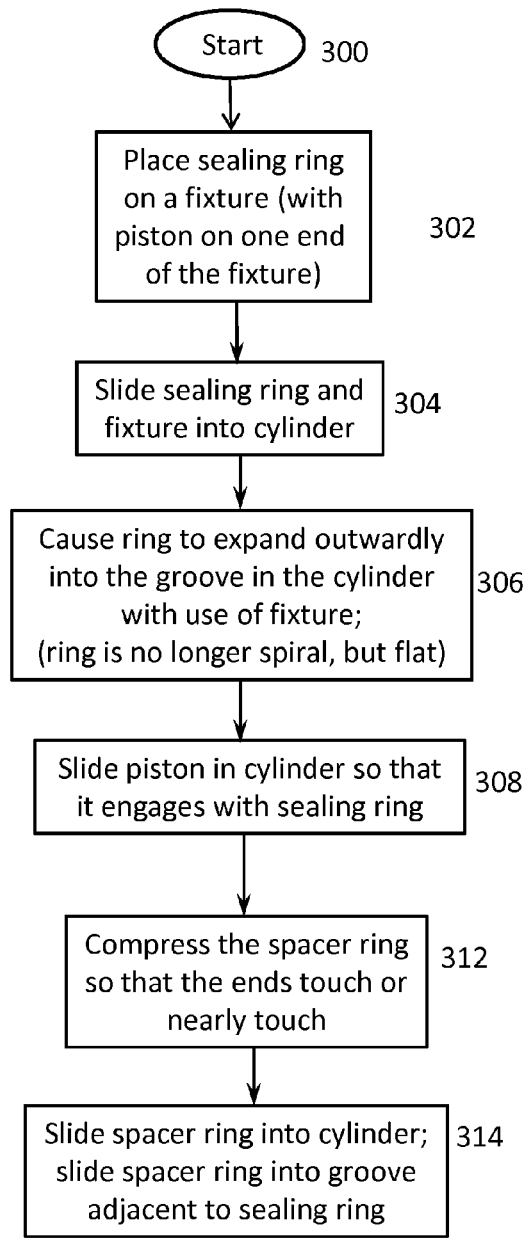

DUAL RING CONFIGURATION FOR A STATIONARY SEAL

FIELD

The present disclosure relates to a ring arrangement for a stationary seal associated with a reciprocating component.

BACKGROUND

Rings are used to seal between a reciprocating piston and a cylinder. Conventionally, the rings are placed in grooves in the piston. In FIG. 1, a piston 100 is shown viewed from the top. Piston 100 has a piston skirt extending downwardly from the piston top. The piston skirt is generally cylindrical and has grooves formed in the outer surface. The inward edge of the groove is shown as a dashed circle 102. A piston ring 104 is shown that is spread apart to form a gap 106.

The situation when piston ring 104 is allowed to contract into the groove in piston 100 and into the cylinder (not shown) is shown in FIG. 2. Gap 106 is much smaller in the configuration in FIG. 2 than in the expanded position shown in FIG. 1. It is advantageous that gap 106 is very small when ring 104 is installed into the cylinder (not shown) so that a minimal amount of gases can pass through gap 106.

In a two-stroke engine, it is undesirable to lose oil through the ports both from an oil consumption and emissions perspective. Thus, two-stroke engines are provided with an oil ring that is located either in the lower portion of the piston i.e., below the ports or in the cylinder wall below the ports at TDC. A disadvantage of having the oil ring in the piston is that the engine is longer in the direction along the cylinder liner axis. In an OPOC engine, such as disclosed in U.S. Pat. No. 6,170,443, which is incorporated herein in its entirety, the extra length is in the longest dimension of the engine. A stationary seal can be a challenge to install the seal with a small gap in the cylinder liner.

An example of an OPOC engine 10 is shown in FIG. 27. An inner piston 12 and an outer piston 14 are associated with a right cylinder (not shown to view the pistons) and an inner piston 13 and an outer piston 15 are associated with a left cylinder (not shown). Pistons 12 and 13 couple to crankshaft 20 via pushrods 16 and pistons 14 and 15 coupled to crankshaft 20 via pullrods 18 (a pair of pullrods 18 for each outer piston). Inner pistons 12 and 13 have a groove near the bottom of the piston. In contrast, outer pistons 14 and 15 have only grooves for compression rings and no groove to accommodate an oil sealing ring. The oil sealing rings are disposed in grooves in the cylinder liners, not shown in FIG. 27.

A sealing ring, which may serve as a stationary oil ring mounted into the cylinder liner, is shown in FIGS. 3 and 4. A cylinder 120 has a groove formed in an inner surface of cylinder 120. The base of the groove is shown as a dashed circle 122 (hidden line in the view shown in FIG. 3). A ring 124 with a small gap 126 is shown inside cylinder 120. When ring 124 is expanded to fit inside the groove in cylinder 120, gap 126 becomes intolerably large. That is, the gas flow through gap 126 would be too great.

In one alternative of a stationary seal, the cylinder is formed in two parts which couple axially. The groove is located at the end of one cylinder part. The ring is installed into the groove before the two parts of the cylinder are assembled. Disadvantages of this configuration include: higher part count: 2 pieces plus bolts for assembly; extra material to accommodate the bolts; and the requirement that the two pieces be perfectly aligned during machining and final assembly to provide a completely collinear cylinder liner in which the piston may freely reciprocate.

It would be desirable to have a ring that could be installed in groove in a single-piece cylinder, but without a large gap.

SUMMARY

To overcome at least one problem in the prior art, a piston and cylinder assembly is disclosed that has: a cylinder having an annular cylinder groove defined in the inner surface of the cylinder, a sealing ring installed in the cylinder groove wherein ends of the sealing ring are caused to overlap to allow the sealing ring to enter the cylinder and when the sealing ring is placed in the cylinder groove, ends of the sealing ring are proximate each other, and a spacer ring installed in the cylinder groove. Ends of the spacer ring are proximate each other when the spacer ring is contracted to enter the cylinder and when the spacer ring expands in the cylinder groove, ends of the spacer ring are separated by a gap.

The assembly further includes a piston installed in the cylinder proximate the groove wherein the piston is adapted to reciprocate within the cylinder. The sealing ring and the spacer ring encircling the piston and a compression ring installed into an annular groove in the piston.

A height of the sealing ring and a height of the spacer ring are a predetermined height and a height of the groove is not less than twice the predetermined height and substantially equal to twice the predetermined height. The sealing ring forms a helix when the ends of the sealing ring overlap.

When the sealing ring is encircling the piston, the ends of the sealing ring are separated by a gap and the gap in the sealing ring is significantly smaller than the gap in the spacer ring.

The sealing ring has a substantially rectangular cross section with a groove defined in an outer surface of the sealing ring. Some embodiments include an elastomeric seal disposed in the groove in the sealing ring and in other embodiments a tension spring.

Also disclosed is a piston-and-cylinder assembly that includes a cylinder having an annular groove defined in the inner surface of the cylinder, a sealing ring installed in the annular groove, and a spacer ring installed in the annular groove wherein the sealing ring is installed prior to installation of the spacer ring.

Ends of the sealing ring are caused to overlap to allow the sealing ring to form a helix to enter the cylinder. When the sealing ring is placed in the groove, ends of the sealing ring are proximate each other. Ends of the spacer ring are proximate each other when the spacer ring enters the cylinder. When the spacer ring expands in the groove, ends of the spacer ring are separated by a gap.

The sealing ring has an annular groove formed in an outer surface of the sealing ring. The assembly may further include one of a tension spring and a deformable material placed in the annular groove in the sealing ring prior to installing the sealing ring in the groove in the cylinder.

The sealing ring is placed into a helical shape with a diameter less than a diameter of the cylinder to allow insertion of the sealing ring into the cylinder. When the sealing ring is inserted into the groove, it is pressed outwardly to cause the sealing ring to lie in a plane. The spacer ring is placed into a spiral shape with the ends of the ring overlapping to allow insertion of the sealing ring into the cylinder. The spacer ring is pressed outwardly with the ends no longer overlapping when pressed into the groove.

The space ring has a chamfer on one end of the ring to allow the two ends to move past each other when the spacer ring it pressed into the groove. Each of the sealing ring and the spacer ring has at least one groove on an outer surface with a tension spring disposed therein.

Also disclosed is a method to install rings in an annular groove defined in the inner surface of a cylinder, including: causing a sealing ring to form a helix such that ends of the sealing ring overlap, placing the sealing ring in the helix configuration into the cylinder, expanding the sealing ring in the groove such that the ends of the sealing ring no longer overlap, and placing a spacer ring in the groove in the cylinder. The spacer can be a spacer ring. Placing a spacer in the groove in the cylinder includes: compressing a spacer ring such that the ends of the spacer ring are proximate each other, placing the spacer ring in the cylinder, and expanding the spacer ring in the groove adjacent the sealing ring. The expanding the sealing ring in the groove in the cylinder is performed with the use of a fixture to cause the sealing ring to expand outwardly into the groove in the cylinder.

The fixture includes a portion of a cone.

The sealing ring has an annular groove defined in an outer surface of the sealing ring. The method also includes: placing a deformable seal into the groove in the cylinder prior to placing the sealing ring into the cylinder.

The sealing ring has an annular groove defined in an outer surface of the sealing ring. A tension spring is placed into the groove in the cylinder prior to placing the sealing ring into the cylinder.

BRIEF DESCRIPTION OF THE DRAWINGS

FIG. 5 is an illustration of a top view of a cylinder with an internal groove and a ring inside the cylinder with the ring compressed such that the ends overlap;

FIG. 6 is a side view of the ring of FIG. 5 with the ends overlapping;

FIG. 7 is a portion of a cylinder in cross section showing an overlapping ring in a groove in the cylinder;

FIG. 8 is an illustration of a top view of a cylinder with an internal groove and a ring installed in the groove;

FIG. 9 is a side view of the ring of FIG. 8;

FIG. 10 is a portion of a cylinder in cross section showing a ring installed in the groove;

FIG. 11 is a portion of a cylinder in cross section showing two rings installed in the groove;

FIGS. 14 and 15 illustrate procedures by which stationary rings are installed in the groove in the cylinder;

DETAILED DESCRIPTION

Figure 1:
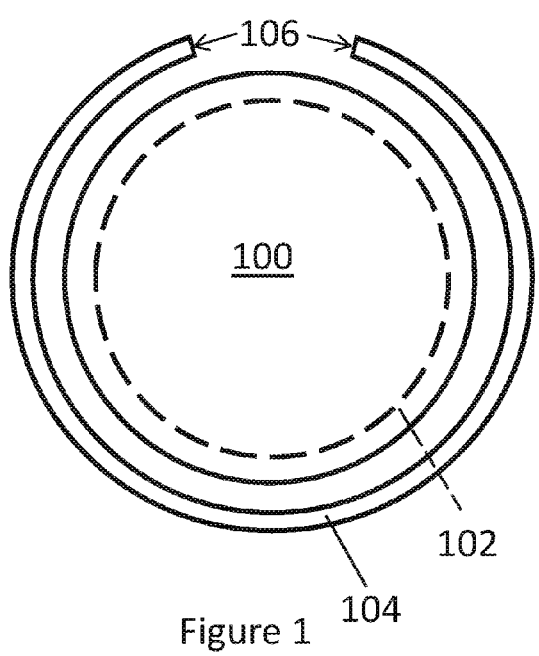
FIGS. 1 and 2 are illustrations of a top view of a piston with an external groove and a piston ring with the ring expanded and contracted, respectively.
Figure 2:
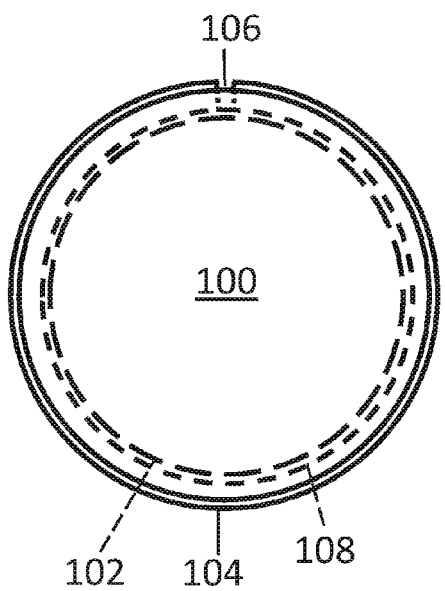
Figure 3:
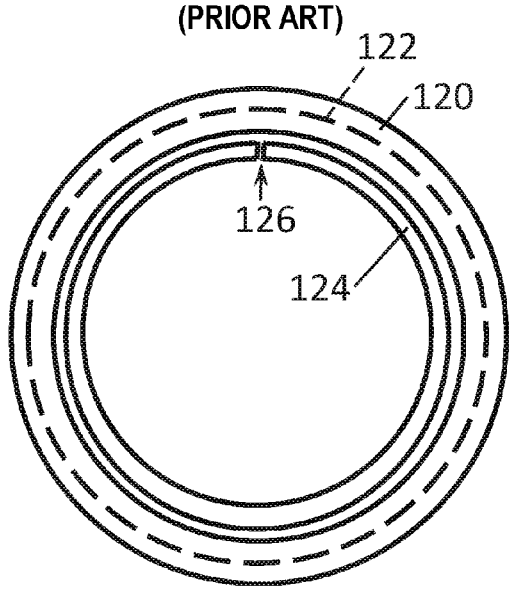
FIGS. 3 and 4 are illustrations of a top view of a cylinder with an internal groove and a ring, with the ring contracted, and expanded, respectively.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

In FIG. 5, a top view of a cylinder 140 is shown. Cylinder 140 has a groove in the inner surface 141 of cylinder 140. The base of the groove is indicated by dashed circle 142. Also shown is a ring 144, which has been compressed so that the two ends overlap in region 146. Ring 144 is shown in a side view in FIG. 6 with overlap region 146. Ring 146 forms a helix and cannot be fit in a groove that is the height of ring 146. Instead, the groove into which ring 146 can fit when in the configuration shown in FIG. 6 is about double the height of ring 146. This is shown in FIG. 7 in which a portion of cylinder 140 is illustrated in cross section. Cylinder 140 has an outer surface 139 and an inner surface 141. A groove is formed in inner surface 141. When ring 144 is compressed, it overlaps. The region of overlap is shown in FIG. 7, i.e., showing two ends of ring 144 in cross section.

In FIG. 8, ring 144 is caused to expand into the groove of cylinder 140. There is no overlap when ring 144 expands and instead a small gap 148 forms. Ring 144 of FIG. 8 is shown in a side view in FIG. 9 with gap 148. When the ends of ring 144 no longer overlap, such as shown in FIG. 10, ring 144 takes up only about half the height of groove 145. In such a configuration, if a piston were reciprocating with respect to cylinder 140, ring 144 would be shoved up and down in groove 145, which would compromise its sealing capability and would readily damage ring 144.

Figure 4:
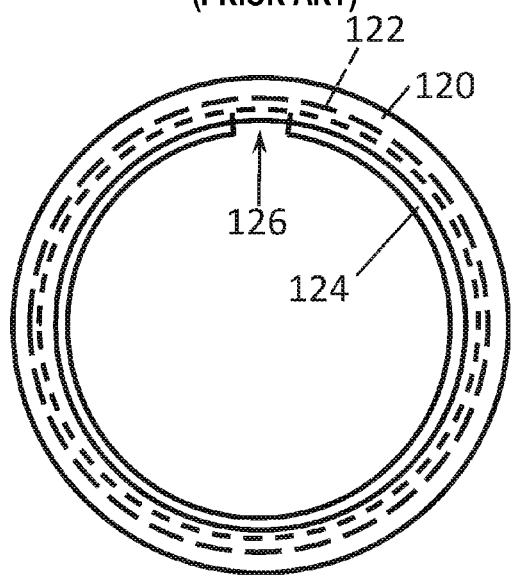

In FIG. 11, a spacer ring 150 is added to the sealing system to take up the space in the groove of cylinder 140. Spacer ring 150 need not provide sealing. Thus, it can be a ring such as shown in FIG. 4 which has a large gap to facilitate its installation into groove 145 after ring 144 has previously been installed. The purpose of spacer ring 150 is to fill the extra space in groove 145 in FIG. 10 to allow ring 144 to properly seat in the groove to provide the desired sealing.

Figure 12:
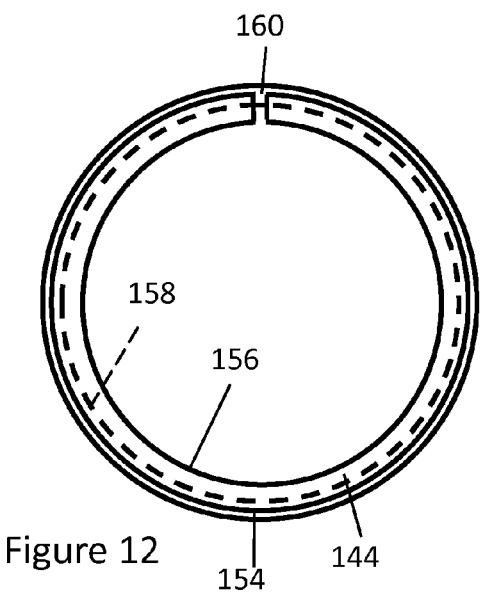
FIG. 12 is an illustration of a sealing ring with a tension spring installed in an outer groove of the sealing ring.

It is desirable for sealing ring 144, such as is shown in FIG. 10, to press against the piston (not shown) to scrape excess oil off the piston as the piston reciprocates in the cylinder. On the back side of ring 144, a groove 149 is provided, as shown in FIGS. 7, 10, and 11. The rings described heretofore are split rings, i.e, having a gap. In one embodiment shown in FIG. 12, a tension spring 160 that is a continuous ring without a gap, is placed in the groove in the piston ring (groove 149 in FIGS. 7, 10, and 11). Groove 149 is not separately visible in FIG. 12; however, the depth of groove 149 is illustrated as dotted circle 158 in FIG. 12. Sealing ring 144 has an inner surface 156 that rides on the piston (not shown) and an outer surface 154 that sits within the groove in the cylinder liner, (groove 145 of FIG. 10). Tension spring 160 has a size and tension to provide the desired force to press surface 156 of ring 144 against the piston. A method by which such a configuration can be installed in the cylinder is discussed below.

Figure 13:
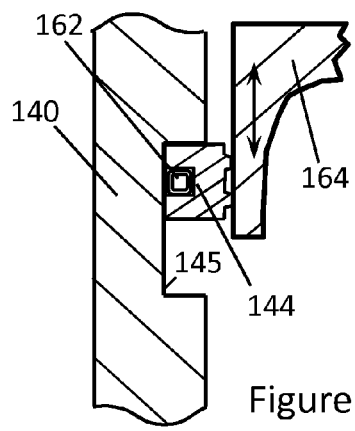
FIG. 13 is an illustration of a portion of a cylinder and piston with a stationary ring in a groove in the cylinder.

Referring now to FIG. 13, an alternative embodiment is shown in which an elastomeric, deformable seal 162 is placed in groove 149 (not separately called out in FIG. 13 because groove 149 is substantially filled by seal 162). When seal 162 is compressed into the groove in the ring, ring 144 is pressed against piston 164, which reciprocates with respect to cylinder liner 140. Seal 162 has a gap and is installed in groove 149 of ring 144 before installing in groove 145 in cylinder 140. Thus, when ring 144 is caused to form a helix to enter the cylinder, seal 162 also forms a helix.

Piston rings, which are designed for installation in a groove in a piston, such as ring 106 in FIG. 1, are manufactured by taking a flat wire and forming it into a helix. The diameter of the helix is greater than the diameter of the ring as it is installed in the piston so that there is spring force causing the ring to press outwardly. A portion of the helix, less than 360°, is severed to form each ring. Such a ring, when compressed to close the gap, provides an outward pressure on the cylinder liner.

In the situation in which the ring is to be installed in a stationary groove in the cylinder liner, the desire is to have a ring that presses inwardly on the piston. A helix is formed that has a diameter less than the diameter of the piston as it is installed in the cylinder liner. The ring cut from the helix to be installed in the groove in the cylinder liner extends over 360°, i.e., the ends overlap. The ring must be forced to expand to enter the groove so that the ends no longer overlap.

A procedure by which the stationary rings can be installed into the groove in the cylinder liner starts at 200 in FIG. 14. In block 202, a deformable seal, possibly an elastomeric material, is placed into the groove in the ring. Alternatively, a tension spring is placed in the groove in the piston. In block 204, the sealing ring is caused to form a helix or spiral with a diameter less than the diameter of the cylinder. In block 206, the sealing ring is slid into the cylinder. In block 208, the ring is caused to expand in the groove in the cylinder. In one embodiment, the ring is expanded by use of a fixture. The piston is slid into the cylinder to engage with the sealing ring in block 210. In block 212, the spacer ring is compressed so that the ends are proximate each other. The spacer ring is placed in the cylinder and then expanded into the groove in the cylinder in block 214.

In embodiments in which there is no groove in the sealing ring and the neutral position of the sealing ring is such that outer diameter of the sealing ring is less than the cylinder, the procedure starts in 300 of FIG. 15. In block 302, the sealing ring is placed on a fixture. In one embodiment, the bottom of the piston is coupled to one end of the fixture. The sealing ring and fixture are slid into the cylinder in block 304. In block 306, the fixture is used to cause the ring to expand outwardly and to expand into the groove in the cylinder. In the process, the ends of the rings no longer overlap to form a helix. Instead the ends of the ring are proximate each other and the ring lies in a plane. In block 308, the piston is slid toward the sealing ring so that the sealing ring encircles the piston (rather than the fixture). The spacer ring is compressed so that the ends touch in block 312. The spacer ring is slid into the cylinder and allowed, or forced, to expand into the groove adjacent to the sealing ring 314.

Figure 16:
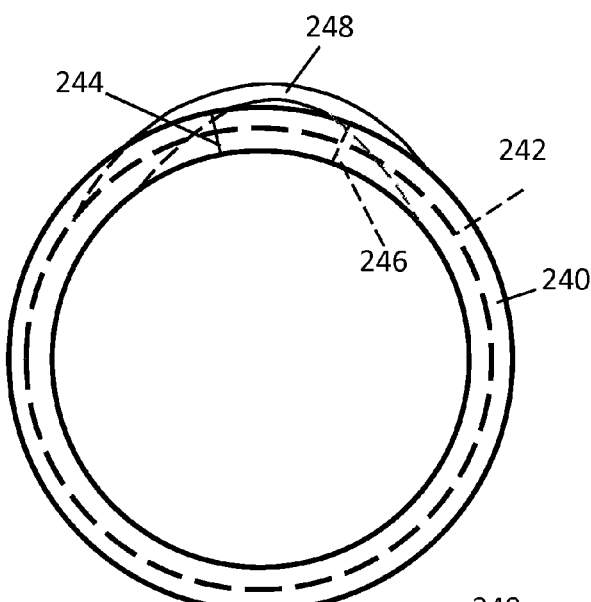
FIG. 16 is an illustration of the sealing ring and a tension spring when ends of the sealing ring overlap according to an embodiment of the disclosure.
Figure 17:
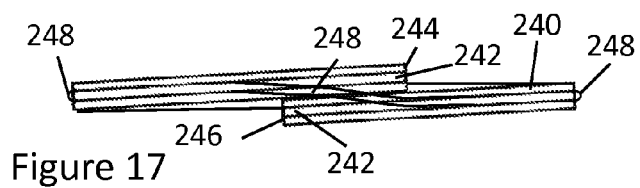
FIGS. 17-24 are illustrations of an installation dual rings in a groove in unitary cylinder liner.

Referring now to FIG. 16, a sealing ring 240 has a groove, the bottom of which is shown by dashed circle 242. Sealing ring 240 has been formed into a helix by overlapping ends 244 and 246 (per block 202 in FIG. 14). A tension spring 248 is placed in the groove. But, the tension spring 248 bulges out in the region of overlap. Returning now to FIG. 14, the result of block 204 appears as shown in FIG. 16. In block 208, the sealing ring expands in the groove in the cylinder such that it is no longer in a helix, but instead lies in a plane. While this occurs, the tension spring should pop fully into the groove in the cylinder with the bulge being taken up. A fixture may be used to cause the ring to expand as desired. The fixture may be used in block 214 to assist in installing the piston into the cylinder. Ring 240 of FIG. 16 is shown in a side, helical orientation in FIG. 17. Groove 242 is only visible in the areas near the ends 244 and 246 of ring 240 because tension spring 248 is in groove 242 over most of the circumference of ring 240. In the area of the bulge, tension spring 248 is out of the groove and bends downwardly from the upper portion of ring 240 on the left hand side of FIG. 17 to the lower portion of ring 240 on the right hand side. Tension spring 248 causes ring 240 to push inwardly toward the piston to seal against the piston.

In an alternative embodiment, a deformable seal is placed in groove 242 of ring 240. The deformable seal is sized so that it is deformed upon assembly so that it causes the ring to be pushed inwardly. The deformable seal is not formed in a continuous ring but is instead a ring with a gap with the gap aligned with the gap in the sealing ring or is a linear seal that is placed in the groove in the sealing ring.

Figure 18:
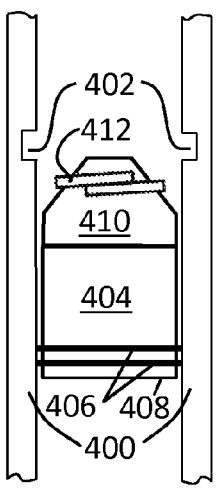
Figure 19:
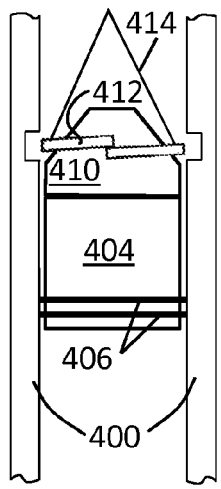
Figure 20:
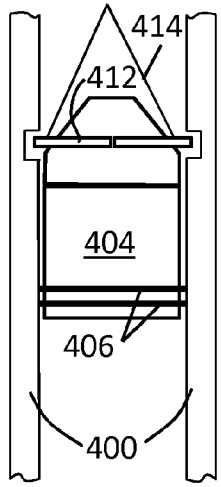
Figure 21:
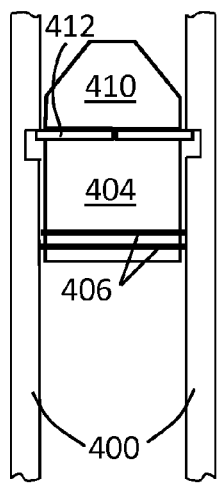
Figure 22:
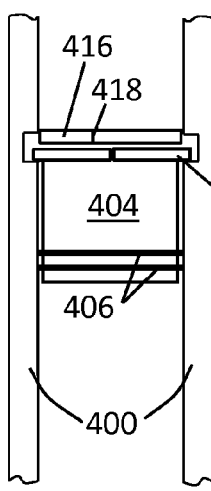
Figure 23:
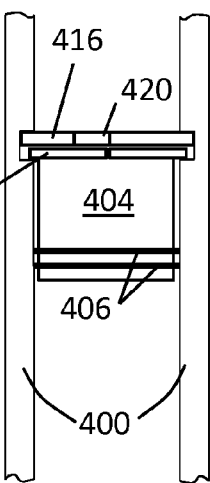
Figure 24:
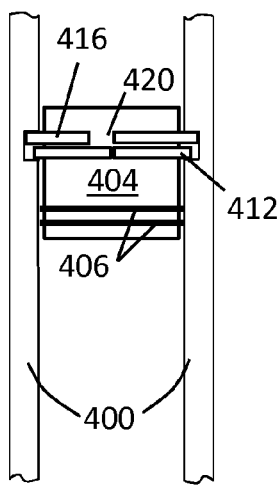

Referring now to FIG. 18, a slice of cylinder 400 that has a groove 402 is shown with a piston 404 inserted therein. Piston 404 has two compression rings 406 near the top 408 of piston 404 (top of piston refers to the end of the piston proximate the combustion chamber, not the orientation in FIGS. 18-24). A first portion of a fixture 410 is placed against piston 404. Sealing ring 412 is placed over fixture 410. In one embodiment, ring 410 is shown in its neutral position in FIG. 18, i.e., with no spring tension. In FIG. 19, a second portion of a fixture 414 is used to press sealing ring 412 onto first fixture portion 410 causing sealing ring 412 to expand outwardly. Ring 412 presses inwardly due to spring tension. Referring now to FIG. 20, second fixture portion 414 pushes down even more on ring 412 to cause it to expand in such a manner that it no longer assumes a helical configuration and pops into groove 402. Ring 412 has a slight gap, as small as reasonable considering tolerances in cylinder 400. In FIG. 21, fixture 410 and piston 404 are moved upwardly so that ring 412 is slid off of fixture 410 and onto piston 404. Ring 412 presses inwardly on piston 404. Ring 412 is prevented from moving upwardly because it is contained in groove 402. In FIG. 22, fixture 410 has been removed and a spacer ring 416 is compressed and placed in cylinder 400. As compressed, ring 416 has negligible gap 418. In FIG. 23, spacer ring 416 is placed below the edge of groove 402 and caused to spring outwardly, thereby forming a gap 420. In FIG. 24, piston 404 is moved upwardly such that spacer ring 416 now encircles piston 404 and sealing ring 412 is now encircling piston 404 at a different location than the end of piston 404, as shown in FIG. 23.

In an alternative embodiment, sealing ring 412 is provided with a tension spring in a groove in the outer surface of ring 412. The tension spring is caused to pop fully into the groove in sealing ring 412 in between the orientations illustrated in FIGS. 19 and 20.

Figure 25:
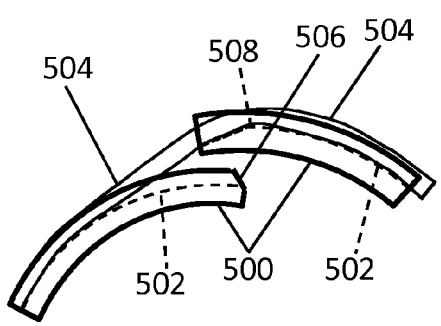
FIG. 25 is an illustration of a two portions of a spacer ring with a portion of a tension spring in a groove in the spacer ring.

In FIG. 25, an alternative embodiment of a spacer ring 500 in which a tension spring 504 is shown. Only the ends of spacer ring 500 are shown. Spacer ring 500 has a groove 502 on the outside surface. Tension spring 504 is placed in groove 502. As described above in regards to another embodiment of the spacer ring, a large gap is formed between the ends of the spacer ring when it is installed in the groove. In the embodiment in FIG. 25, the ring is spiraled such that the ring lies in a single plane with the two ends of the ring overlapping. A chamfer 506 is provided on one of the ends of spacer ring 500 so that when unspiraling spacer ring 500, chamfer 506 allows the two ends to move past each other and leave a shorter gap. Chamfer 506 can be slightly curved with the curve designed so that a corner of the opposite end of the ring strikes such a curve during installation. Additionally, groove 502 is cutback further in region 508 in an end of the ring. The cutback allows the ring to assume a smoother profile during the installation procedure. Without such a cutback, tension spring 504 would have a significant bend.

Figure 26:
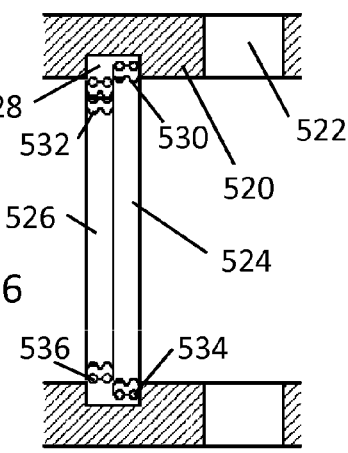
FIG. 26 is an illustration of a cylinder liner having a sealing ring and a spacer ring disposed in a groove in the cylinder liner.
Figure 27:
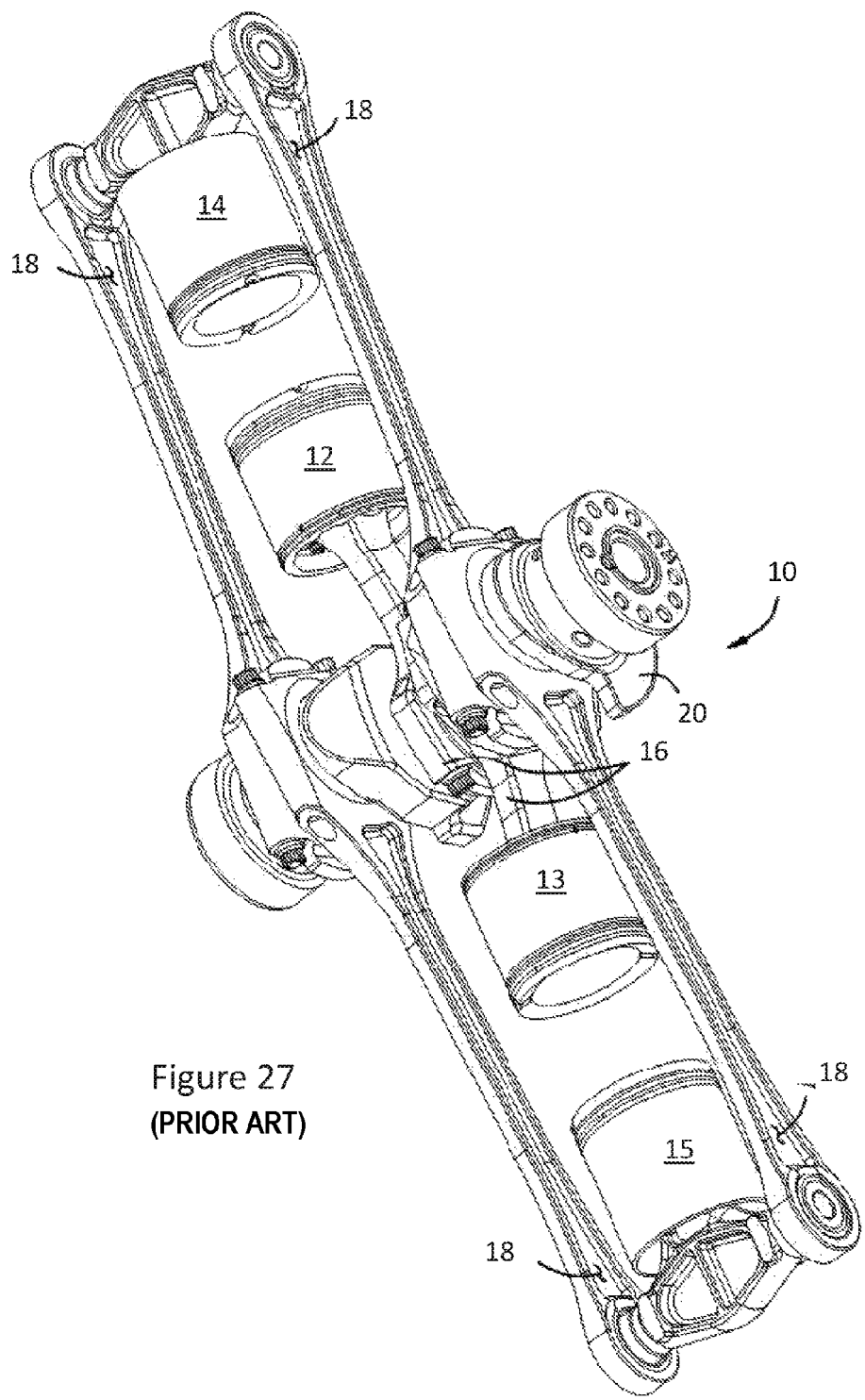
FIG. 27 is an isometric representation of a drive train of an OPOC engine.

A view of the cylinder liner 520 with ports 522 is shown in FIG. 26. A groove 528 provided in the cylinder liner has a sealing ring 524 and a spacer ring 526 disposed therein. Both of rings 524 and 526 have an inner surface, i.e., the surface that wipes the piston, with two ridges 530 and 532, respectively. Each of ring 524 and 526 have two grooves (not visible) into which tension springs 534 and 536 are installed. Multiple tension springs can be used to provide more tension on the sealing and spacer rings.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A piston and cylinder assembly, comprising
a cylinder having an annular cylinder groove defined in an inner surface of the cylinder;
a split sealing ring installed in the cylinder groove, the split sealing ring having a compressed state in which ends of the split sealing ring to overlap to size the split sealing ring for receipt within the cylinder and an expanded state within the cylinder groove in which the ends of the split sealing ring are proximate each other; and
a split spacer ring installed in the cylinder groove adjacent to the split sealing ring, the split spacer ring having a compressed state in which ends of the split spacer ring are proximate each other to size the split spacer ring for receipt within the cylinder and an expanded state within the cylinder groove in which the ends of the split spacer ring are separated by a gap.

2. The assembly of claim 1, further comprising a piston installed in the cylinder proximate the cylinder groove, wherein the piston is adapted to reciprocate within the cylinder.

3. The assembly of claim 1 wherein the split sealing ring has a first height and the split spacer ring has a second height, and wherein a height of the cylinder groove is not less than a sum of the first and second heights.

4. The assembly of claim 1, wherein the split sealing ring forms a helix in the compressed state thereof.

5. The assembly of claim 1, further comprising:
a piston disposed in the cylinder with the split sealing ring and the split spacer ring encircling the piston; and
a compression ring installed into an annular groove defined in the piston.

6. The assembly of claim 5, wherein, with the split sealing ring encircling the piston, the ends of the split sealing ring are separated by a sealing ring gap and the sealing ring gap is smaller than the gap separating the ends of the spacer ring.

7. The assembly of claim 1 wherein the sealing ring has a substantially rectangular cross section with a groove defined in an outer surface of the sealing ring, the assembly further comprising: an elastomeric seal disposed in the groove in the sealing ring.

8. The assembly of claim 1 wherein the sealing ring has a substantially rectangular cross section with a groove defined in an outer surface of the sealing ring, the assembly further comprising: a tension spring disposed in the groove in the sealing ring.

9. A piston and cylinder assembly, comprising:
a cylinder having an annular groove defined in an inner surface of the cylinder;
a split sealing ring installed in the annular groove, the split sealing ring having a compressed state in which ends of the split sealing ring overlap to size the split sealing ring for receipt within the cylinder and an expanded state within the annular groove in which the ends of the split sealing ring are proximate each other, the split sealing ring defining a first height defined by the overlapped ends of the split sealing ring in its compressed state and a second height, less than the first height, defined by the split sealing ring in its expanded state, wherein the annular groove is sized to receive therein the first height of the split sealing ring, and wherein a space is defined between the annular groove and the second height of the split sealing ring with the split sealing ring in its expanded state within the annular groove; and
a spacer ring installed in the annular groove adjacent to the split sealing ring and filling the space defined in the annular groove.

10. The assembly of claim 9, wherein
the split sealing ring forms a helix in the compressed state thereof.

11. The assembly of claim 9 wherein the split sealing ring has an annular groove formed in an outer surface thereof, and wherein the assembly further comprise
one of a tension spring and a deformable material placed in the annular groove in the sealing ring prior to installing the sealing ring in the annular groove.

12. The assembly of claim 9 wherein the spacer ring is a split spacer ring having two ends and a chamfer on one end thereof to allow the two ends to move past each other when the spacer ring is installed in the groove.

13. The assembly of claim 9, wherein each of the split sealing ring and the spacer ring have at least one groove on an outer surface thereof with a tension spring disposed therein.

14. A method to install rings in an annular groove defined in the inner surface of a cylinder, comprising:
- causing a sealing ring to form a helix such that ends of the sealing ring overlap;
- placing the sealing ring in the helix configuration into the cylinder;
- expanding the sealing ring in the groove such that the ends of the sealing ring no longer overlap; and
- placing a spacer ring in the groove in the cylinder by compressing the spacer ring such that ends of the spacer ring are proximate each other, placing the compressed spacer ring in the cylinder, and expanding the compressed spacer ring in the groove adjacent the sealing ring.

15. The method of claim 14 wherein the expanding the sealing ring in the groove in the cylinder is performed with the use of a fixture to cause the sealing ring to expand outwardly into the groove in the cylinder.

16. The method of claim 15 wherein the fixture includes a portion of a cone.

17. The method of claim 14 wherein the sealing ring has an annular groove defined in an outer surface of the sealing ring, the method further comprising: placing a deformable seal into the groove in the cylinder prior to placing the sealing ring into the cylinder.

18. The method of claim 14 wherein the sealing ring has an annular groove defined in an outer surface of the sealing ring, the method further comprising: placing a tension spring into the groove in the cylinder prior to placing the sealing ring into the cylinder.

* * * * *